United States Patent [19]

Meyer

[11] Patent Number: 4,943,001
[45] Date of Patent: Jul. 24, 1990

[54] TUBE-TYPE VESSEL HAVING CREVICE-FREE JOINTS AND METHOD FOR MANUFACTURING THE SAME

[75] Inventor: John J. Meyer, St. Louis, Mo.

[73] Assignee: Nooter Corporation, St. Louis, Mo.

[21] Appl. No.: 70,570

[22] Filed: Jul. 7, 1987

[51] Int. Cl.$^5$ .............................................. B23K 31/02
[52] U.S. Cl. .................. 228/173.4; 228/183; 228/196; 228/216; 219/60.2; 165/173; 29/890.043; 29/890.054; 285/189
[58] Field of Search ...................... 228/183, 170, 173.4, 228/196, 219, 216; 165/173; 285/189; 29/157.4; 219/60.2, 60 A, 61

[56] References Cited

U.S. PATENT DOCUMENTS

| | | | |
|---|---|---|---|
| 2,996,600 | 8/1961 | Gardner, Jr. et al. | 228/183 |
| 4,221,263 | 9/1980 | Meyer | 165/173 |
| 4,535,214 | 8/1985 | Meyer et al. | 219/60.2 |
| 4,579,171 | 4/1986 | Stafford et al. | 228/173.4 |

FOREIGN PATENT DOCUMENTS

| | | | |
|---|---|---|---|
| 0026434 | 4/1981 | European Pat. Off. | 228/173.4 |
| 1222973 | 2/1971 | United Kingdom | 165/178 |

Primary Examiner—M. Jordan
Assistant Examiner—Samuel M. Heinrich
Attorney, Agent, or Firm—Gravely, Lieder & Woodruff

[57] ABSTRACT

A tube-type heat exchanger has two tubesheets, each provided with a multitude of bores, and tubes which extend between the tubesheets at their bores, their hollow interiors opening into the bores. Each tube at its ends is joined to the tubesheets along fillet welds which, being free from crevices, eliminate the build up of deposits and corrosion which commonly develop in the crevices of heat exchangers. To assemble the heat exchanger, each tube is passed through a bore in one of the tubesheets and advanced toward the other tubesheet, its leading end being inserted into a socket at the end of a bore in the other tubesheet. Then the leading end of the tube is welded to the tubesheet at which it is located. This leaves the trailing end of the tube in the bore of the tubesheet through which the tube was initially inserted, and that bore likewise terminates at a socket. The trailing end of the tube is machined down from within the bore until it extends no farther than the socket at the end of the bore. Next the trailing end is expanded against the wall of the socket. Then it is welded to the tubesheet. This leaves the tube with crevice-free fillet welds at both of its ends.

11 Claims, 4 Drawing Sheets

TUBE-TYPE VESSEL HAVING CREVICE-FREE JOINTS AND METHOD FOR MANUFACTURING THE SAME

BACKGROUND OF THE INVENTION

This invention relates in general to tube-type vessels and more particularly to a tube-type vessel having crevice-free joints at the ends of its tubes and to a method of manufacturing and assembling such vessels.

In the typical tube-type heat exchanger, tubes extend between tubesheets to which they are welded, thus creating two isolated fluid passages — one through the tubes and another around the exterior surfaces of the tubes. These passages accommodate different fluids at different temperatures, thus enabling a transfer of heat through the walls of the tubes from the fluid of higher temperature to the fluid of lower temperature.

Various procedures exist for joining the tubes to the two tubesheets at the ends of the heat exchanger. One of the easiest is to merely extend the tubes loosely into bores within the tubesheets and then roll the tubes from within their interiors into tight contact with the surfaces of the bores, but this leaves the heat exchanger with crevices at the back faces of its tubesheets, where the tubes enter those tubesheets. Certain fluids when in the vapor phase tend to deposit precipitates in crevices, and these deposits, when in a crevice surrounding a tube, may girdle the tube, even to the extent of causing a total collapse. Other fluid becomes extremely corrosive in crevices. Aside from that, a tube that is simply expanded against its tubesheet does not create a positive connection with the tubesheet and is thus more susceptible to leakage than it would be if welded to the tubesheet.

Indeed, it is common practice to weld the tubes of a heat exchanger to the tubesheets at its ends, and this is most conveniently achieved by extending the tubes completely through their respective bores in the tubesheets and welding their ends to the front faces of the tubesheets, that is to the faces which are presented away from the fluid that is circulated through the spaces between the tubes. But this procedure, even though it produces a positive connection between the tubes and the tubesheets, still leaves crevices at the back faces of the tubesheets where the tubes enter the bores in such tubesheets. The fluid that is in the spaces between the tubes may enter these crevices and leave deposits or may effect a corrosion of the tube and tubesheets.

A process exists for eliminating the crevices at one of the tubesheets, and this process involves forming a short counterbore or socket at the front face of a tubesheet where the bore for each tube opens out of the front face. The tube for the bore fits into the socket, and is welded to the tubesheet autogenously from within the bore. This leaves a crevice-free weld around the tube where it enters the tubesheet. In this procedure the end of the tube projects a specified distance into the tubesheet, in order to achieve an effective weld. Because the tubesheets are large and very heavy, it is impossible to position them perfectly parallel for welding. As a consequence, the tubes are secured to only one of the tubesheets using this procedure, and at the other tubesheet they are brought completely through their respective bores and welded to the front face of that tubesheet. This leaves the heat exchanger with crevices in the back face of only one of its tubesheets, but this is often not a problem, because the heat exchanger can be positioned such that the fluid which is against the creviced back face is less likely to produce crevice buildup or corrosion.

The process for producing fillet-type welds at the back face of one of the tubesheets is disclosed in U. S. Pat. Nos. 4,221,263 and 4,535,214.

In other heat exchangers, it is not enough to have crevice-free joints at only one tubesheet; they need to be at the opposing back faces of both tubesheets.

DESCRIPTION OF THE DRAWINGS

In the accompanying drawings which form part of the specification and wherein like numerals and letters refer to like parts wherever they occur.

DETAILED DESCRIPTION

Figure 1:
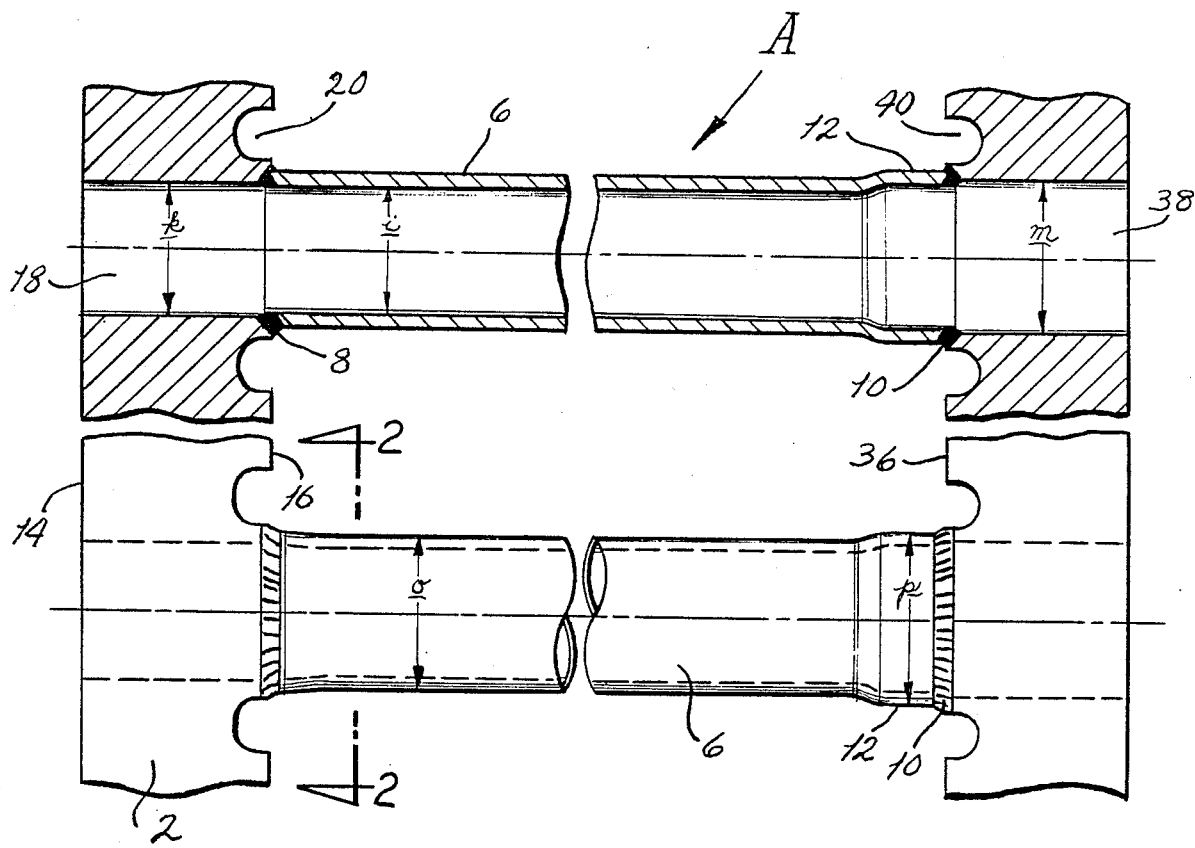
FIG. 1 is a fragmentary side elevational view, partially broken away and in section, of a heat exchanger having its tubes welded to its tubesheets in accordance with the present invention.

Referring now to the drawings, a tube-type heat exchanger A (FIG. 1) suitable for transferring heat from one fluid to another fluid, includes two tubesheets 2 and 4 which are spaced one from the other and a multitude of tubes 6 which extend between the tubesheets 2 and 4 and are welded to those tubesheets at fillet welds 8 and 10, respectively, so that no crevices exist where the tubes 6 open into either one of the tubesheets 2 and 4. As a result, the fluid which circulates through the spaces between the tubes 6 and over their exterior surfaces, and even though that fluid may have the capacity to produce a crevice build up, it will not do so, because of the total absence of crevices. Similarly, the fluid may be extremely corrosive in crevices, but the absence of crevices inhibits its corrosive effect. Of course the space between the two tubesheets 2 and 4 is enclosed with a suitable closure (not shown) to confine the one fluid to that space. Similarly, each of the tubesheets 2 and 4 is connected to a suitable header (not shown) for directing the other fluid to that tubesheet or away from it.

Each tubesheet 2 and 4 is machined from steel, preferably a high alloy steel forging or plate, and may be typically 5 feet in diameter and 6 to 8 inches thick, or larger. Obviously, the tubesheets 2 and 4 have considerable mass and are not easily maneuvered for welding or for any other purpose. The tubes 6, which typically have an outside diameter of about one inch and a wall thickness of about 0.040 to 0.125 inches, are drawn from a steel which is compatible with the steel of the tubesheets 2 and 4 in the sense that the two steels may be joined together at autogenous welds, that is to say along welds that contain no filler metal. Indeed, the fillet welds 8 and 10 are just that type of weld. The tubes 6 have a constant outside and inside diameter through substantially their entire length, but they are expanded slightly where they are joined to the tubesheet 4 so as to provide an enlarged end 12. Thus, the fillet welds 10 are slightly greater in diameter than the fillet welds 8. In other words, the tube 6 has a nominal outside diameter o and inside diameter i which exist throughout substantially its entire length, except at its enlarged end 12 where the outside diameter p and inside diameter j are slightly greater than the diameters o and i.

Figure 2:
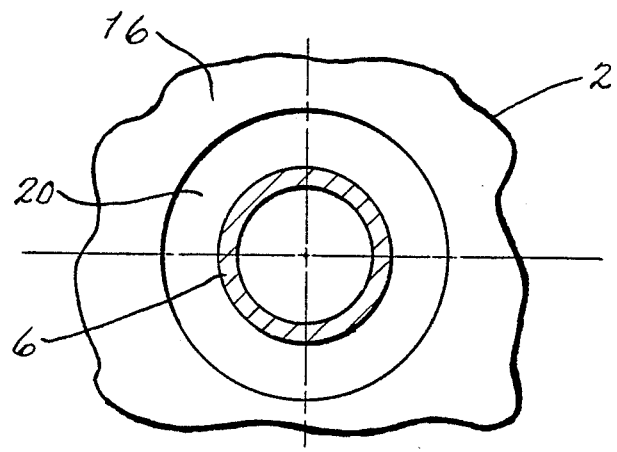
FIG. 2 is a sectional view taken along line 2—2 of FIG. 1.

The tubesheet 2 has a front face 14 and a back face 16 as well as bores 18 which extend between the front and back faces 14 and 16 with their axes perpendicular to those faces. Each bore 18 aligns axially with and opens into a different tube 6, and where it opens into its tube 6 it is encircled by a fillet weld 8. Immediately beyond the back face 16 of the tubesheet 2, the outside diameter o of each tube 6 is slightly greater than the diameter k of the bore 18 with which the tube 6 aligns, while the inside diameter i of the tube 6 is slightly less. The fillet weld 8 forms a gentle and beveled transition between the surface of the bore 18 and the smaller inside surface of the tube 6. At each fillet weld 8 the tubesheet 2 is provided with an annular groove 20 (FIG. 2) which opens out of the back face 16 of that tubesheet and encircles the fillet weld 8 and the bore 18 around which it exists.

The tubes 6 are joined to the tubesheet 2 in accordance with the procedure set forth in U. S. Pat. No. 4,535,214 of J. Meyer and S. Barth granted Aug. 13, 1985. To this end, the tubesheet 2, in addition to having the machined front and back faces 14 and 16, the bores 18 and the annular grooves 20, are manufactured with shallow counterbores or sockets 22 (FIG. 3A) at the ends of its bores 18, and it is through these sockets 22 that the bores 18 open out of the back face 16, at least initially. Each socket 22 axially aligns with and indeed forms a part of the bore 18 along which it is located, and its diameter is only slightly greater than the outside diameter o of the tube 6. This enables the end of the tube 6 to fit easily within socket 22 but no farther. The relationship between the diameter of the bore 18, the inside diameter i and outside diameter o of the tube 6, and the diameter and depth of the socket 22 are all set forth in U. S. Pat. No. 4,221,263 of J. Meyer, granted Sept. 9, 1980.

Figure 3A:
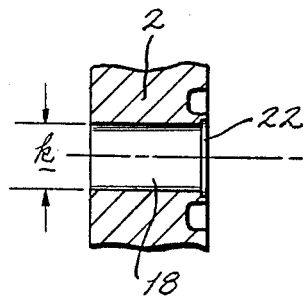
FIGS. 3A-H are a succession of views sequentially showing the steps of assembling the heat exchanger.
Figure 3A:
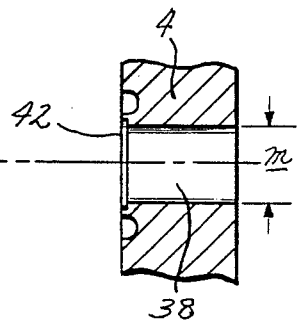
Figure 3B:
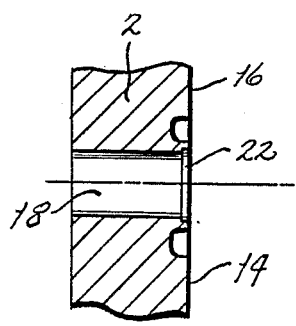
Figure 3B:
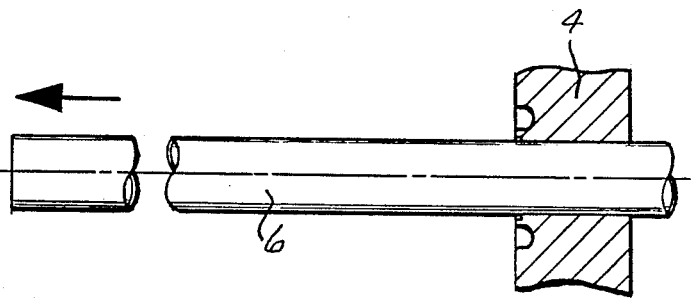
Figure 3C:
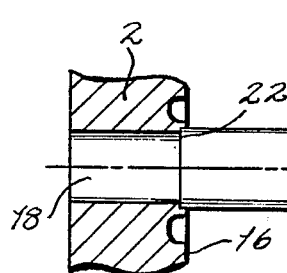
Figure 3C:
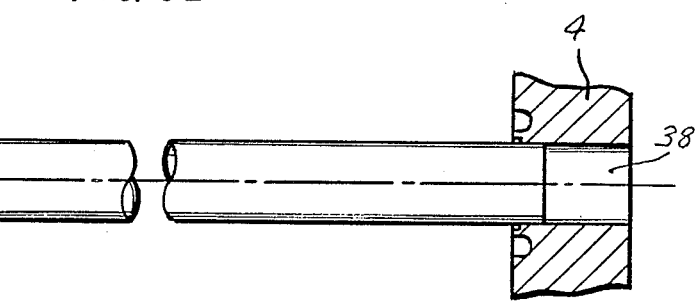

To attach the tube 6 to the tubesheet 2, the end of the tube 6 is inserted into a socket 22 of the tubesheet 2 until the tube 6 bottoms out against the end of that socket (FIG. 3C). Then a split ring mold 24 (FIGS. 3D & 4) which is, preferably formed from an incompatible metal, such as copper, is fitted around and closed about the tube 6. The mold 24 at one of its ends has a nose 26 which conforms in size and configuration to the annular groove 20, and indeed aligns with the groove 20 when the mold 24 is closed around the tube 6. Immediately beyond the nose 26 is an inwardly presented beveled surface 28. The mold 24 is advanced along the tube 6 until its nose 26 enters and seats within the annular groove 20 around the end of the tube 6. This places the beveled surface 28 directly opposite the end of the socket 22, that is, opposite the circular crevice which exists between the counterbore 22 and the outside surface of the tube 6.

With the tube 6 and mold 24 so positioned, a welding head 30 (FIGS. 3D & 4) having an electrode 32 which orbits, is inserted into the bore 18 from the front face 14 of the tubesheet 2, and it is adjusted until the tip of the electrode 32 is located generally opposite the portion of the tube 6 that is within the socket 22, although quite close to the bottom of the socket 22. Moreover, an inert gas is directed into the bore 18 and the interior of the tube 6 as well, and also along the inside faces of the mold 26. The inert gas floods the region of the socket 22, both internally and externally of the tube 6, and as to the latter is for the most part concentrated in the void circumscribed by the beveled surface 28 of the mold 24.

With the inert atmosphere so established, the electrode 32 is energized and an arc is struck between the end of the tube 6 and the electrode 32, while at the same time the electrode 32 is turned so that its tip describes an orbit which is set only slightly inwardly from the inside surface of the tube 6. The rotation carries the arc around with the tip and is sustained for slightly over one revolution. During this single revolution, the arc melts the end of the tube 6 as well as the surrounding portion of the tubesheet 6, that is the portion between the counterbore 22 and the surrounding groove 20, and totally obliterates the socket 22. Indeed, the groove 20 concentrates the heat of the arc in the thin region between it and the counterbore 22, thereby insuring a thorough melting of the tubesheet 2 in this region. The mold 24, on the other hand, confines the molten metal uniformly within the region of the melt and thus prevents the metal from flowing under the influence of gravity. This enables the welding to proceed while the tube 6 is oriented either horizontally or vertically. Indeed, the molten metal flows against and conforms to the taper of the beveled surface 28 on the mold 24. It solidifies into a smooth gently tapered transition between the end of the tube 6 and the tubesheet 2. This transition constitutes the fillet weld 8 for the tube 6.

The other tubesheet 4 also has a front face 34 and a back face 36, as well as bores 38 which extend between the two faces 36 and 38 and open into the hollow interiors of the tubes 6. However, the bores 38 are slightly larger in diameter than the bores 18 of the tubesheet 2 — indeed larger than the nominal outside diameter o of the tubes 6. Well they should be, for the tubes 6 are passed through the bores 38 in order to be aligned with the sockets 22 and bores 18 in the tubesheet 2. They are further confined in the bores 38 at their trailing or remote ends while their leading opposite ends are welded to the tubesheet 2.

The fillet welds 10 which join the enlarged ends 12 to the tubesheet 4 are each surrounded by annular grooves 40 which open out of the back face 36 of the tubesheet 4, and are identical to the grooves 20 of the tubesheet 2, except that they have a slightly greater diameter to accommodate the larger outside diameter p of the enlarged ends 12 for the tubes 6. Moreover, the inside diameter j of the enlarged end 12 of each tube 6 is slightly smaller than the diameter m of the bore 38 with which that tube 6 aligns, while the outside diameter p is slightly larger than that of the bore 38.

Figure 3D:
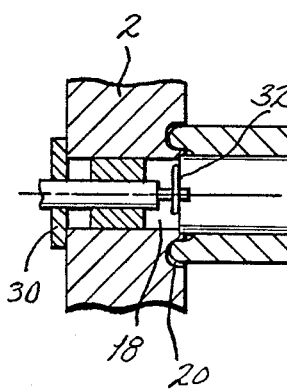
Figure 3D:
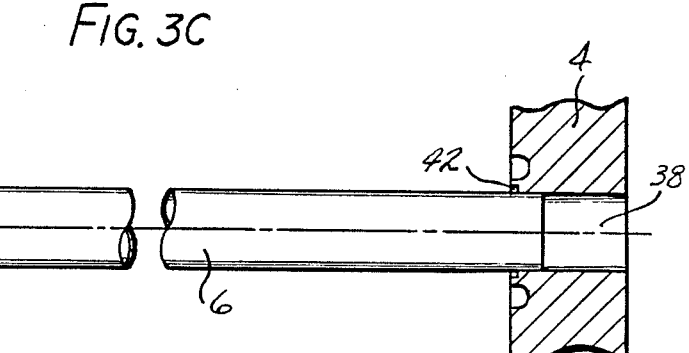
Figure 3E:
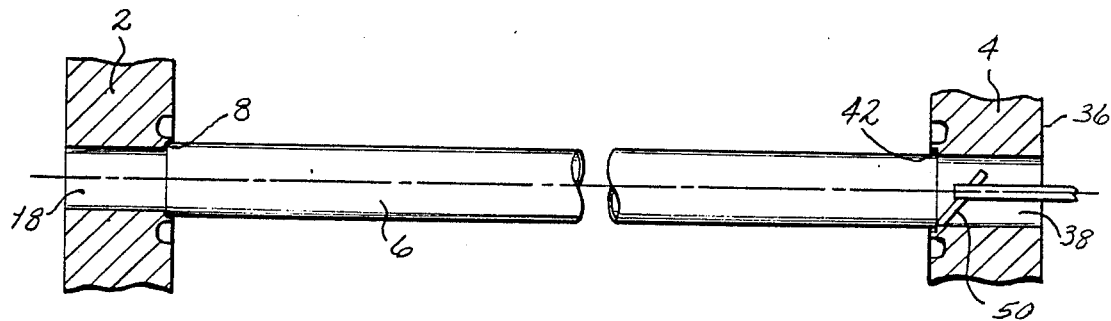
Figure 3F:
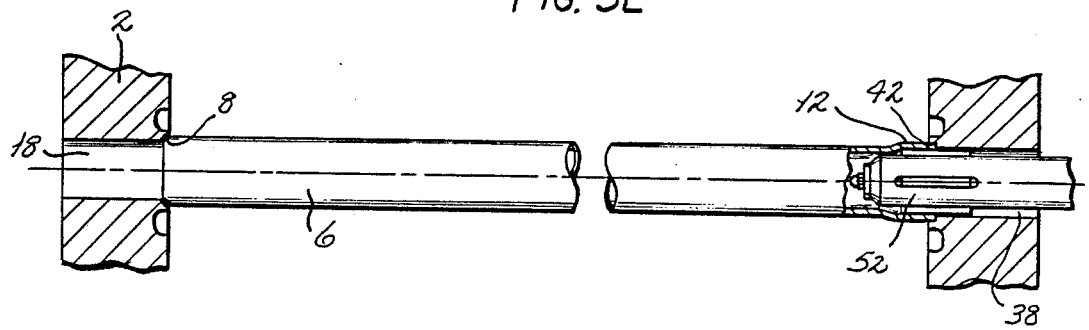
Figure 5:
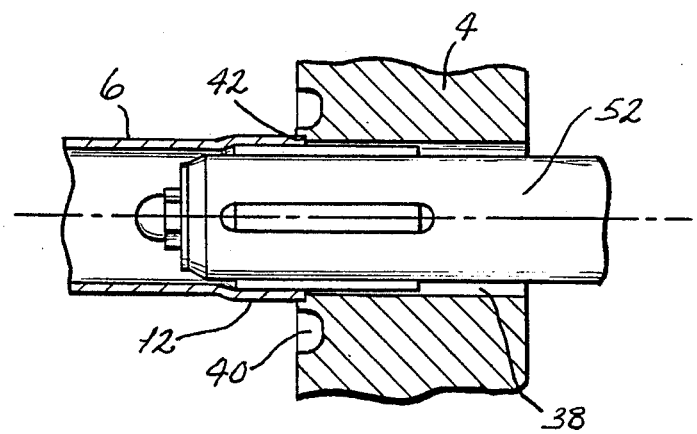
FIG. 5 is a fragmentary view showing the mandrel for expanding the trailing end of the tube to produce an enlargement of that end.

Like the tubesheet 2, the tubesheet 4 is initially provided with a counterbore or socket 42 (FIG. 3A) at the end of each of its bores 38, that is, at the end which opens out of the back face 36. This socket 42, which axially aligns with and forms part of its bore 38, receives the very end of the enlarged end 12 for the tube 6, but only after the enlarged end 12 is machined down so that its end face is at the base of the socket 42 (FIG. 3E) and further only after the end of the tube 6 is expanded from within the tube 6 to actually provide the enlarged end 12 which fills the socket 42 (FIGS. 3F & 5). The relationship between the diameter of the bore 38, the inside and outside diameter j and p of the enlarged end 12, and the diameter and depth of the socket 42 are all set forth in U. S. Pat. No. 4,221,263.

After the tube 6 is machined to the proper length and expanded into the socket 42, another split ring mold 44 is placed around the tube 6 near the back face 36 of the tubesheet 4. Like the mold 24, the mold 44 has a nose 46 and a beveled surface 48, but the nose 46 is sized and otherwise configured to fit into the larger annular groove 40. Moreover, the mold 44 has an inside diameter that is large enough to accommodate the outside diameter p of the enlarged end 12. The beveled surface 48 exists between the latter and the nose 46. Once the mold 44 is around the tube 6, it is advanced toward the tubesheet 4, whereupon it passes over the expanded end 12. Its nose 46 enters the annular groove 40 and seats against the base of that groove. When the mold 44 is so positioned, its beveled surface 48 surrounds the region of the enlarged end 12 that is within the socket 42 and is presented toward the circular crevice that exists between the enlarged end 12 and the socket 42.

Figure 3G:
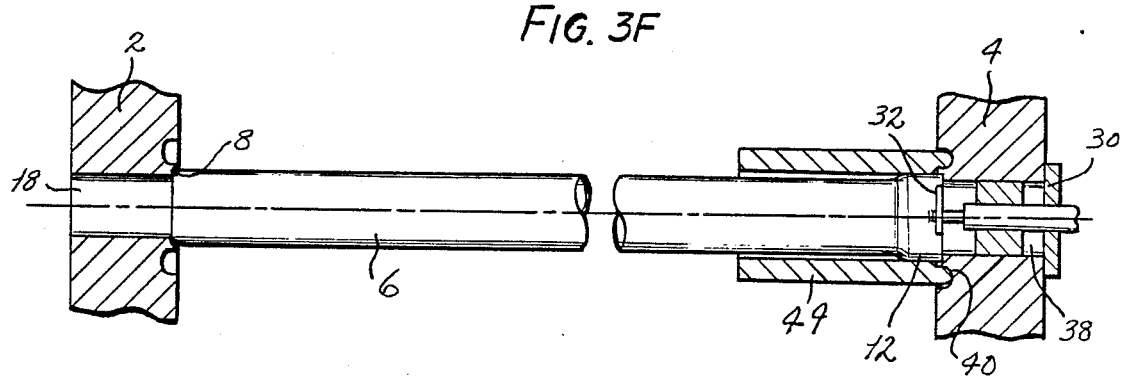
Figure 6:
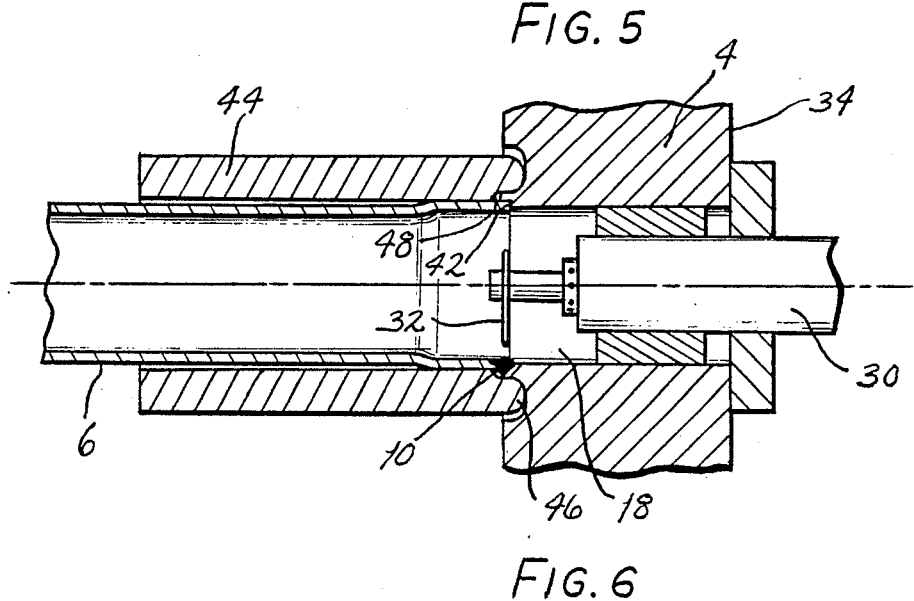
FIG. 6 is a fragmentary sectional view showing the ring mold and welding head at the enlarged trailing end of the tube.

With the mold 44 in place, the welding head 30 is inserted into the bore 38 from the front face 34 and is adjusted so that the electrode 32 is opposite that portion of the end 12 that is within the counterbore 42 — indeed only slightly offset from the bottom of the counterbore 42 (FIGS. 3G & 6). Moreover, the electrode 32 is adjusted radially so that it is quite close to, yet spaced from, the inside surface of the enlarged end portion 12. After an inert gas is introduced into the bore 38 and into the interior of the enlarged end 12 and also along the interior surfaces of the mold 44 so as to flood the region circumscribed by the beveled surface 48, the electrode 32 is energized and an arc is struck between its tip and the nearby inside surface of the enlarged end 12. The electrode 32 is thereupon caused to rotate through one revolution. The arc melts the metal of the tube 6 in the region of the socket 42 and the metal of the tubesheet 4 between the socket 42 and the annular groove 40, totally obliterating the counterbore 42. The molten metal spreads outwardly and conforms to the beveled surface 48 on the mold 44, resulting in a smooth and gentle tapered transition between the enlarged end portion 12 of the tube 6 and the back face 36 of the tubesheet 4. That transition is the fillet weld 10 which joins the enlarged end 12 of the tube 6 to the tubesheet 4.

To summarize the construction and assembly of the heat exchanger A, the tubesheet 2 is machined to provide it with the front and back faces 14 and 16, the bores 18 and sockets 22, and the annular grooves 20 which surround the sockets 22. Likewise, the tubesheet 4 is machined to provide it with the front and back faces 34 and 36, the bores 38 and socket 42, and the annular grooves 40 surrounding the sockets 42. Once the two tubesheets 2 and 4 are completely machined, they are positioned opposite each other, that is to say with their respective back faces 16 and 36 presented toward each other, and of course with the proper spacing between them (FIG. 3A). The tubesheets 2 and 4 are further oriented such that their respective bores 18 and 38 align, that is to say, for every bore 38 in the tubesheet 4, a corresponding bore 18 exists in the tubesheet 2 with the axis of the latter being for all intents and purposes on the same axis as the former. In short, the bores 18 and 38 are arranged in coaxial pairs, there being a corresponding bore 38 in the tubesheet 4 for each bore 18 in the tubesheet 2.

Figure 4:
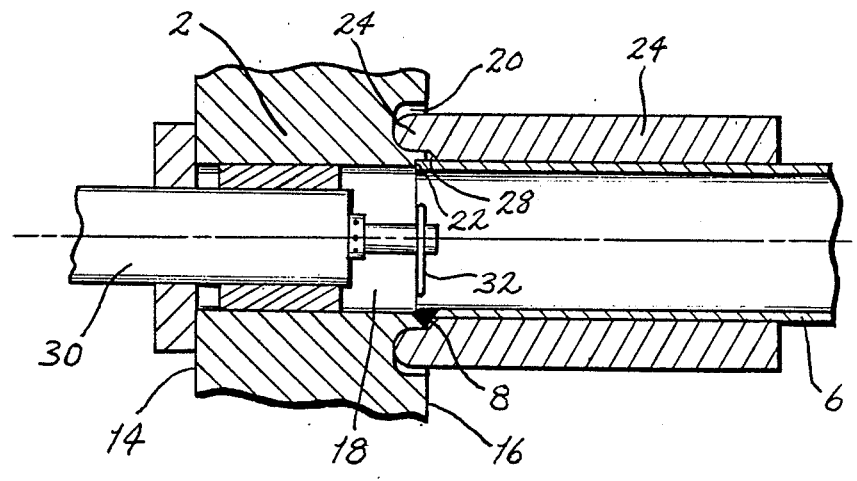
FIG. 4 is a fragmentary sectional view showing the ring mold and welding head in place at the normal or leading end of the tube.

Beginning near the center of two of the tubesheets 2 and 4, a straight tube 6 of constant inside and outside diameters i and o is inserted through the bore 38 of the tubesheet 4 from the front face 34 of that tubesheet, and this tube 6 is advanced through the space between the two tubesheets 2 and 4 until its leading end comes to the other tubesheet 2 (FIG. 3B). Its leading end is then inserted into the socket 22 for the aligned bore 18 in the tubesheet 2. Indeed, the tube 6 is advanced until its leading end bottoms out at the base of the socket 22 (FIG. 3C). The trailing end of the tube 6 extends completely through the socket 42 and into the bore 38 of the tubesheet 4. With the tube 6 so positioned, the ring mold 24 is fitted around it near the tubesheet 2, and once closed the mold 24 is advanced until its nose 26 seats within the annular groove 20 that surrounds the socket 22 (FIGS. 3D & 4). Also from the front face 14 of the tubesheet 2, the welding head 30 is directed into that bore 18 which aligns with the tube 6 (FIGS. 3D & 4). The head 30 is adjusted to bring the tip of its electrode 32 to the proper axial and radial position, the front face 34 being employed as a reference surface to achieve and maintain that position.

After an inert gas is introduced into the bore 18 and the aligned tube 6, and also into the interior of the mold 24 to flood the region surrounded by the beveled surface 28, the electrode 32 is energized, an arc is struck, and the electrode 32 is rotated to bring its tip through a complete revolution. The arc which is established melts the seated leading end of the tube and the region of the tubesheet 2 that is isolated between the counterbore 22 and the annular groove 20, but this molten metal is confined by the beveled surface 28 of the mold 24. The metal quickly solidifies into a fillet weld 8 which extends completely around the tube 6, producing a gentle, crevice-free, transition between the tube 6 and the tubesheet 2. The mold 24 is then removed from the tube 6, and the welding head 30 is withdrawn from the bore 18.

The initial length the tube 6 exceeds its final length by perhaps as much as 0.50 inches, so that when the leading end of the tube 6 is joined to the tubesheet 2 at the fillet weld 8, the trailing end lies within the aligned bore 38 of the other tubesheet 4 somewhat beyond the base of the socket 42 for that bore (FIG. 3D). In short, the trailing end lies somewhat closer to the front face 34 than it should be, but this extra length is necessary because it is impossible to support the two tubesheets 2 and 4 in a truly parallel condition. In other words, if all of the tubes 6 were initially cut to the same finished length, some would be too long while others would be too short, and in neither case would it be possible to obtain an effective fillet weld 10. Thus, each tube 6 must be cut to a length which is perhaps peculiar with it. This is achieved by inserting an end mill or a fly cutter 50 into the bore 38 from the front face 34 of the tubesheet 4 and machining the trailing end of the tube 6 down until it just clears the base of the socket 42 (FIG. 3E). Although this machine work is performed under a blind condition, the proper depth is easily determined by measuring the penetration from the front face 34 of the tubesheet 4. In other words, the front face 34 serves as a reference surface for determining the depth to which the machining of the end of the tube 6 is carried.

Once the tube 6 shortened to the extent that its trailing end lies entirely within the counterbore 42, the trailing end is expanded to form the enlarged end 12. This is achieved by inserting one or a succession of expansion mandrels 52 often called pill rollers, into interior of the tube 6 from the front face 34 of the tubesheet 4 and working the trailing end of the tube 6 outwardly from the inside (FIGS. 3F & 5). To this end, each mandrel has rollers which roll along the inside surface of the tube 6 at ever-increasing diameters, and in effect roll-form the tube 6 outwardly until its outer surface bears snugly against the encircling surface of the socket 42.

Thereafter, the ring mold 44 is placed around the tube 6 and moved over the enlarged end 12 until its nose 46 seats within the annular groove 40 that surrounds the trailing end of the tube 6 in the tubesheet 4 (FIGS. 3G & 6). Also the welding head 30 is inserted into the bore 38 from the front face 34 of the tubesheet 4 and is adjusted so that the tip of its electrode 32 locates close to the inside surface of the enlarged end 12 slightly beyond the base of the counterbore 42. An inert gas is pumped into the bore 38 and tube 6 and more is pumped along the inner surface of the ring mold 44, the latter being for the purpose of flooding the region of the tube 6 and back face 36 that is circumscribed by the beveled surface 48 on the ring mold 48.

Figure 3H:
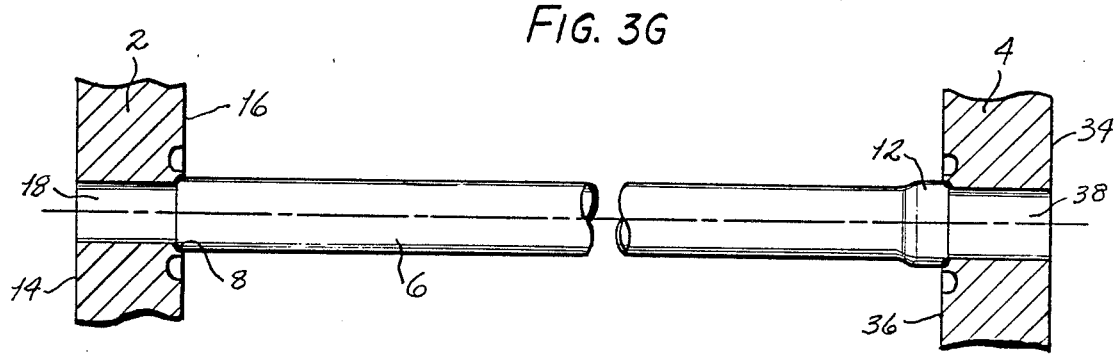

With the inert gas flowing, the electrode 32 of the welding head 30 is energized and an arc is struck between the electrode 32 and the enlarged end 12. Moreover, the electrode is caused to undergo a single revolution, so that its tip and the arc which exists at it make a single revolution. The arc melts the metal at the end of the tube 6 and in the intervening region between the socket 42 and the annular groove 40. The molten metal solidifies against the beveled surface 48 of the ring mold 44, producing a gentle transition between the enlarged end 12 of the tube 6 and the tubesheet 4, and that transition is the fillet weld 10. Upon completion of the weld 10, the ring mold 44 is removed from the tube 6, while the welding head 30 is withdrawn from the bore 48 (FIG. 3H).

The remaining tubes 6 are installed and welded one at a time to the tubesheets 2 and 4 in a similar manner, working from the center of the two tubesheets 2 and 4 outwardly. In other words, one tube should be welded in place at both ends before the next tube is installed.

In lieu of cutting the end of the tube 6 while it is in the bore 18 of the tubesheet 4, the tube 6 may be cut while remote from the tubesheets 2 and 4. For example, the tube 6 may be inserted through the bore 18 and its leading end brought into the socket 22 of the tubesheet 2. Then a scribe mark is made on the tube 6 at the back face 34 of the tubesheet 4. Next the tube 6 is withdrawn from the two tubesheets 2 and 4 and cut off beyond the scribe mark at a distance equalling the depth of the socket 42. The tube 6 is then again inserted through the bore 18 and into the socket 22 and welded in place, its trailing end of course being expanded before the welding.

Since the tubes 6 are joined to both of the tubesheets along the fillet welds 8 and 10, no crevices exist along the back faces 16 and 36 of those tubesheets, particularly around the ends of the tubes 6. This avoids the girdling effect produced by deposits and inhibits corrosion.

This invention is intended to cover all changes and modifications of the example of the invention herein chosen for purposes of the disclosure which do not constitute departures from the spirit and scope of the invention.

What is claimed is:

1. A process for manufacturing a tube-type vessel, said process comprising: providing a first tubesheet having front and back faces and first bores extended generally between those faces as well as first sockets arranged such that the first bores open out of the back face through the first sockets; providing a second tubesheet having first and second faces and second bores extending generally between those faces as well as second sockets arranged such that the second bores open out of the back face through the second sockets, the diameter of the second bores being greater than the diameter of the first bores and the diameter of the second sockets being greater than the diameter of the first sockets; positioning the tubesheets with their back faces presented toward each other and with their bores aligned, so that for each first bore in the first tubesheet, a corresponding second bore in the second tubesheet aligns with it, with the sockets at the ends of those bores being presented toward each other; inserting a separate tube axially through each second bore in the second tubesheet and bringing its leading end into the socket at the end of the corresponding first bore in the first tubesheet, the tube having an outside diameter that is greater than the diameter of the first bore but less than the diameter of the first socket at the end of the first bore and also less than the diameter of the second bore; while the leading end of the tube is in the first socket, welding that end of the tube to the back face of the first tubesheet around the first bore with which it is aligned; expanding the trailing end of the tube into the second socket at the end of the second bore through which the tube was inserted, so as to produce an enlarged end portion having an outside diameter that is larger than the diameter of the second bore; and while the trailing end of the tube is in the second socket, welding that end of the tube to the back face of the second tubesheet around the second bore with which the tube aligns.

2. The process according to claim 1 wherein each tube is longer than the space between the back faces of the two tubesheets and projects into the second bore after being welded to the back face of the first tubesheet; and wherein the process further comprises removing a portion of the trailing end of the tube from within the second bore prior to expanding the tube into the second socket for that second bore through which it was inserted.

3. The process according to claim 1 wherein the step of welding the leading end of the tube to the back face of the first tubesheet produces a crevice-free fillet weld around the leading end of the tube, and wherein the step of welding the enlarged trailing end of the tube to the back face of the second tubesheet produces a crevice-free fillet weld around the trailing end of the tube.

4. The process according to claim 1 wherein the tube projects into the second bore beyond the second socket thereof when the leading end of the tube is in the first socket and while the leading end is welded to the first tubesheet; and wherein the process further comprises removing that portion of the tube which projects beyond the second socket before expanding the trailing end of the tube.

5. The process according to claim 4 wherein the steps of welding the ends of the tube to the first and second tubesheets include inserting a welding head into the bore of a tubesheet and producing an arc between the welding head and the portion of the tube that is within the socket.

6. The process according to claim 5 wherein the step of welding the ends of the tubes to the tubesheets occurs autogenously.

7. The process for assembling a tube-type vessel from a first tubesheet having front and back faces and first bores extending generally between those faces as well as first sockets which open out of the back face around the first bores, from a second tubesheet having front and back faces and second bores extending generally between those faces as well as second sockets which open out of the back face around the second bores, the second bores being larger in diameter than the first bores and the second sockets being larger in diameter than the first sockets, and from tubes having an outside diameter greater than the diameter of the first bores, but less than the diameter of the first socket and the diameter of the second bores, said processing comprising: positioning the first and second tubesheets such that their back faces are presented toward each other, but with a space between those faces, and such that the second bores of the second tubesheet align with the first bores of the first tubesheet, so that for every second bore and socket in the second tubesheet there is aligned with it a corresponding first bore and socket in the first tubesheet; inserting a separate tube through each second bore in the second tubesheet and inserting the leading end of that tube into the first socket of the corresponding first bore in the first tubesheet, the tube being initially long enough to extend beyond the second socket of the second tubesheet and into the second bore of the second tubesheet when its leading end is the first socket of the first tubesheet; reducing the length of the tube so that when its leading end lies within the first socket of the first tubesheet, its trailing end lies within, but extends no farther than, the second socket of the second tubesheet; while the ends of the tubes are in the sockets of the tubesheets, expanding the trailing end of the tube into the second socket so that its outside diameter is larger than the diameter of the second bore; and welding the leading and trailing ends of the tubes to the first and second tubesheets around the ends of the first and second bores respectively.

8. The process according to claim 7 wherein the leading end of the tube is welded to the first tubesheet before the trailing end is expanded.

9. The process according to claim 8 wherein the step of reducing the length of the tube occurs after the leading end of the tube is welded to the first tubesheet.

10. The process according to claim 9 wherein the step of reducing the length of the tube comprises cutting the tube from within the second bore into which it projects.

11. The process according to claim 7 wherein the steps of welding produce crevice-free fillet welds between the tube and the back faces of the first and second tubesheets.

* * * * *